(12) United States Patent
Ohashi et al.

(10) Patent No.: US 9,908,467 B2
(45) Date of Patent: Mar. 6, 2018

(54) VEHICLE INTERIOR ILLUMINATION DEVICE

(71) Applicant: YAZAKI CORPORATION, Tokyo (JP)

(72) Inventors: Tomonori Ohashi, Shizuoka (JP); Hiroko Barasawa, Shizuoka (JP); Terumitsu Sugimoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/366,760

(22) Filed: Dec. 1, 2016

(65) Prior Publication Data

US 2017/0158123 A1  Jun. 8, 2017

(30) Foreign Application Priority Data

Dec. 3, 2015 (JP) ................. 2015-236836

(51) Int. Cl.
| | |
|---|---|
| *B60Q 1/14* | (2006.01) |
| *B60Q 9/00* | (2006.01) |
| *B60Q 3/02* | (2006.01) |
| *G06K 9/00* | (2006.01) |
| *H05B 33/08* | (2006.01) |
| *B60Q 3/20* | (2017.01) |
| *B60Q 3/80* | (2017.01) |

(Continued)

(52) U.S. Cl.
CPC ............ *B60Q 9/00* (2013.01); *B60Q 3/0293* (2013.01); *G06K 9/00791* (2013.01); *H05B 33/086* (2013.01); *H05B 33/0854* (2013.01); *H05B 33/0872* (2013.01); *B60Q 3/20* (2017.02); *B60Q 3/217* (2017.02); *B60Q 3/51* (2017.02); *B60Q 3/59* (2017.02); *B60Q 3/60* (2017.02); *B60Q 3/80* (2017.02)

(58) Field of Classification Search
CPC ... B60Q 3/00; B60Q 3/20; B60Q 3/51; B60Q 3/59; B60Q 3/60; B60Q 3/80; B60Q 3/217
USPC ............................ 315/77; 362/543, 487, 488
See application file for complete search history.

(56) References Cited

U.S. PATENT DOCUMENTS 6,402,354 B1 * 6/2002 Tatewaki ................. B60Q 3/74
362/234
8,876,343 B2 * 11/2014 Murray .................. B60Q 1/323
315/77

(Continued)

FOREIGN PATENT DOCUMENTS

DE   10 2011 005 967 A1   12/2011
JP          11-217040 A    8/1999

(Continued)

OTHER PUBLICATIONS

German Office Action for the related German Patent Application No. 102016224059.5 dated Oct. 25, 2017.

(Continued)

*Primary Examiner* — Thuy Vinh Tran
(74) *Attorney, Agent, or Firm* — Kenealy Vaidya LLP

(57) ABSTRACT

A vehicle interior illumination device includes: illumination parts respectively provided in a plurality of positions in a vehicle; and a control part which controls turning on and off operations and illuminating colors of the illumination parts. The control part allows the illumination parts respectively to emit lights by different colors of a same type relating to a theme selected by the control part.

4 Claims, 6 Drawing Sheets

(51) Int. Cl.
    *B60Q 3/51*     (2017.01)
    *B60Q 3/60*     (2017.01)
    *B60Q 3/59*     (2017.01)
    *B60Q 3/217*    (2017.01)

(56) References Cited

U.S. PATENT DOCUMENTS

| | | | |
|---|---|---|---|
| 8,901,844 B2* | 12/2014 | Miller | H05B 33/0863 |
| | | | 315/291 |
| 9,169,984 B2* | 10/2015 | Takada | F21S 48/1291 |
| 2006/0285341 A1 | 12/2006 | Yatsuda et al. | |
| 2011/0121730 A1* | 5/2011 | Ito | B60Q 3/80 |
| | | | 315/77 |
| 2011/0241544 A1 | 10/2011 | Murray et al. | |
| 2014/0218951 A1 | 8/2014 | Takada | |

FOREIGN PATENT DOCUMENTS

| | | | |
|---|---|---|---|
| JP | 2006-351369 A | 12/2006 | |
| JP | 2011-110977 A | 6/2011 | |
| JP | 2012-221487 A | 11/2012 | |
| JP | 2013-169960 A | 9/2013 | |
| JP | 2014-154298 A | 8/2014 | |

OTHER PUBLICATIONS

Japanese Office Action for the related Japanese Patent Application No. 2015-236836 dated Nov. 14, 2017.

* cited by examiner ary, the vehicle interior illumination device of the present invention can obtain a higher decoration effect than that of the device in which the monochromatic lights are merely allowed to be emitted.
VEHICLE INTERIOR ILLUMINATION DEVICE

CROSS-REFERENCE TO RELATED APPLICATION(S)

This application is based on and claims priority from Japanese Patent Application (Application No. 2015-236836) filed on Dec. 3, 2015, the entire contents of which are incorporated herein by reference.

BACKGROUND

1. Field of the Invention

The present invention relates to a vehicle interior illumination device.

2. Description of Related Art

A motor vehicle includes an illumination device which illuminates an interior of the vehicle. In recent years, there are vehicle interior illumination devices provided for the purpose of decoration of the vehicle interiors (for example, see JP-A-2011-110977).

SUMMARY

In the vehicle interior illumination device provided for the purpose of decoration of the vehicle interior, for example, monochromatic lights selected by a user are allowed to be emitted so as to illuminate the vehicle interior. Thus, a decoration effect is low.

The present invention has been made in view of the above-described circumstances, and an object thereof is to provide a vehicle interior illumination device which can obtain a high decoration effect.

One or more embodiments of the present invention provide, for example, the vehicle interior illumination device according to the following items (1) to (5).

(1) A vehicle interior illumination device including:

illumination parts respectively provided in a plurality of positions in a vehicle; and a control part which controls turning on and off operations and illuminating colors of the illumination parts, wherein the control part allows the illumination parts respectively to emit lights by different colors of a same type relating to a theme selected by the control part.

(2) The vehicle interior illumination device according to (1), wherein the control part selects the theme in accordance with any of an image signal from an image recording part which records an image outside the vehicle, a vehicle interior temperature detection signal from a vehicle interior temperature detection part which detects a temperature in the vehicle, and a vehicle speed detection signal from a vehicle speed detection part which detects a vehicle speed.

(3) The vehicle interior illumination device according to (1) or (2), wherein at least one of the illumination parts includes a light emitting part covered with a cover having an optical part which diffuses or converges and transmits lights, and the light emitting part cannot be viewed by the cover when the illumination part is not turned on.

(4) The vehicle interior illumination device according to any one of (1) to (3), wherein the control part allows at least one of the illumination parts to be flashed when a door is not completely locked in accordance with a detection signal from an incompletely locked door detection part provided in the door of the vehicle.

(5) The vehicle interior illumination device according to any one of (1) to (4), wherein the control part changes the illumination color, an intensity of illumination or a lighting range of at least one of the illumination parts in accordance with a speed of the vehicle based on a detection signal from a vehicle speed detection part which detects a vehicle speed of the vehicle.

In the vehicle interior illumination device having the structure of the above-described (1), since the illumination parts are allowed to emit lights by the different colors of the same type which relate to the selected theme, the vehicle interior can be represented to an atmosphere meeting the theme. Thus, the vehicle interior illumination device of the present invention can obtain a higher decoration effect than that of the device in which the monochromatic lights are merely allowed to be emitted.

In the vehicle interior illumination device having the structure of the above-described (2), since the illumination part is allowed to emit lights by the color in accordance with a scene outside the vehicle, the vehicle interior can be represented in an atmosphere meeting the scene outside the vehicle. Further, the illumination part is allowed to emit lights by the color in accordance with the temperature of the vehicle interior, so that the vehicle interior can be represented in an atmosphere comfortable for persons who ride on the vehicle. Further, the illumination part is allowed to emit lights by the color in accordance with the speed of the vehicle, so that the persons riding on the vehicle can be allowed to feel the vehicle speed.

In the vehicle interior illumination device having the structure of the above-described (3), since the light emitting part is invisible when the illumination part is not turned on, when the light emitting part emits lights, an impressive feeling can be given to the persons riding on the vehicle. Further, the light emitting part is invisible when the illumination part is not turned on. Accordingly, for example, even when the cover has a dark color, the lights of the light emitting part can be assuredly transmitted to the vehicle interior by the optical part which diffuses or converges the lights to transmit the lights.

In the vehicle interior illumination device having the structure of the above-described (4), the illumination part used as a decorated illumination is flashed so that an incompletely locked door may be warned. Thus, the persons riding on the vehicle can be more assuredly warned of the incompletely locked door than a small warning light provided in a periphery of a meter.

In the vehicle interior illumination device having the structure of the above-described (5), since the illumination color, the intensity of illumination or the lighting range of the illumination part used as the decorated illumination is changed in accordance with the speed of the vehicle, the persons riding on the vehicle can be allowed to easily recognize the speed of the vehicle.

According to the present invention, the vehicle interior illumination device which can obtain the high decoration effect can be provided.

The present invention is briefly explained as described above. Further, when mode for carrying out the present invention (refer it to as an "exemplary embodiment", hereinafter) which will be described below is read by referring to the attached drawings, a detail of the present invention will be more clarified.

DETAILED DESCRIPTION

Figure 1:
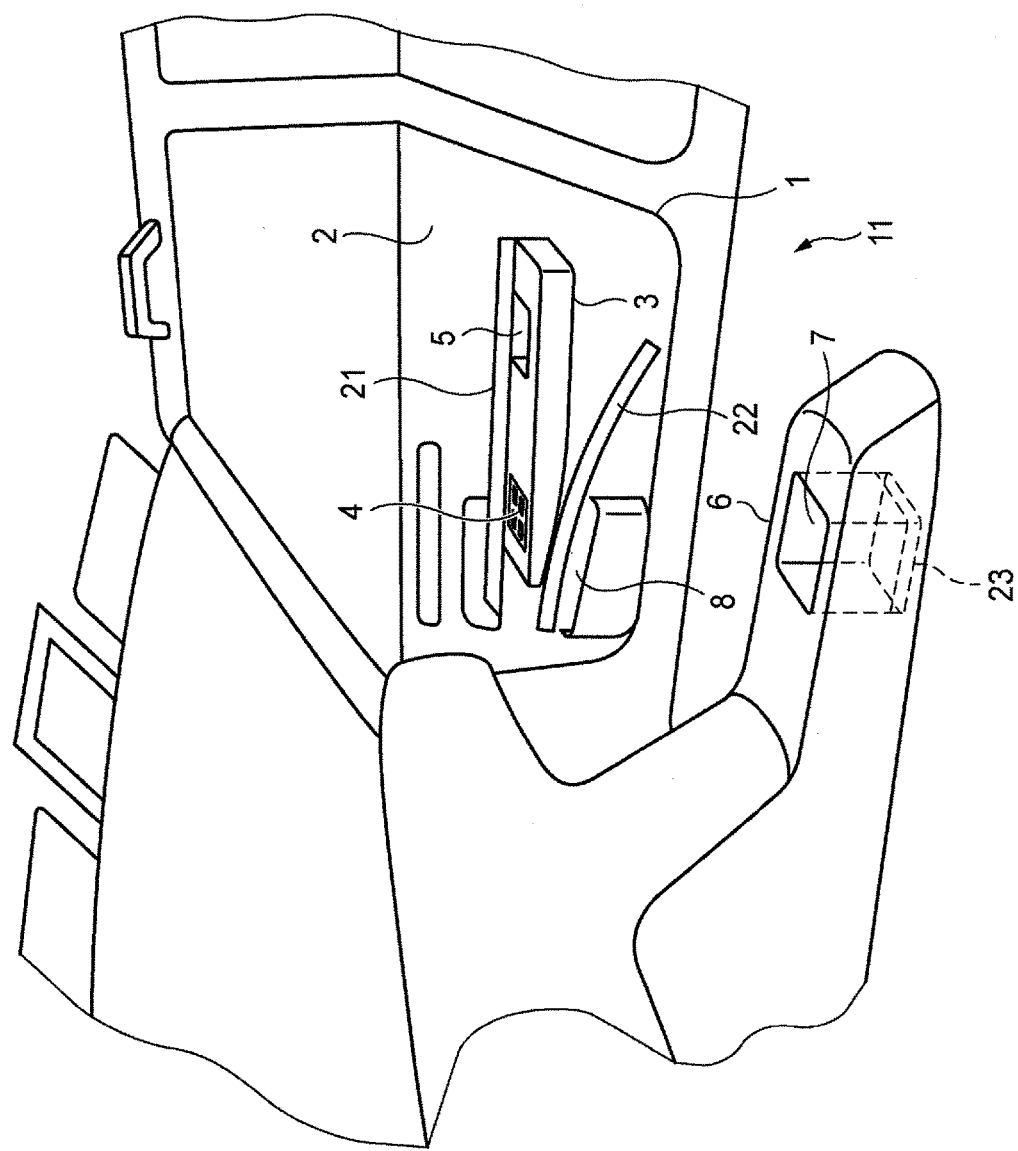
FIG. 1 is a schematic view of a vehicle interior of a motor vehicle provided with a vehicle interior illumination device according to an exemplary embodiment of the present invention.

A specific exemplary embodiment of the present invention will be described below by referring to the drawings respectively.

Figure 2:
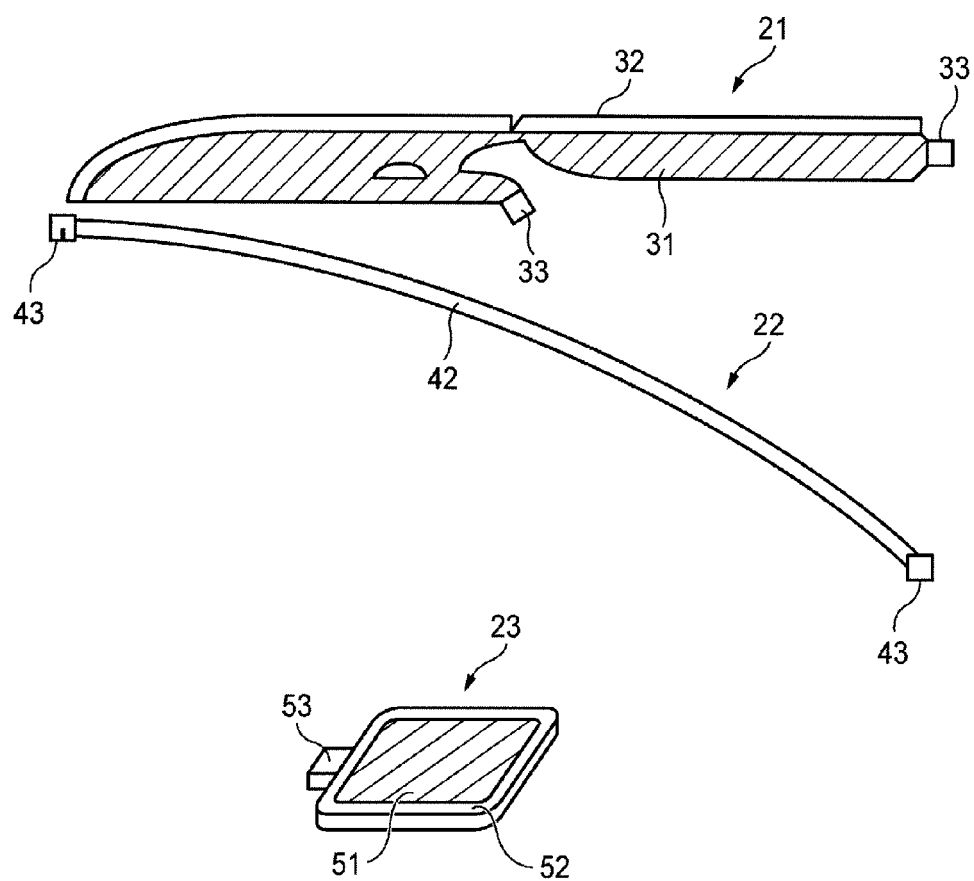
FIG. 2 is a schematic structure diagram of illumination parts of the vehicle interior illumination device according to the present exemplary embodiment.
Figure 3:
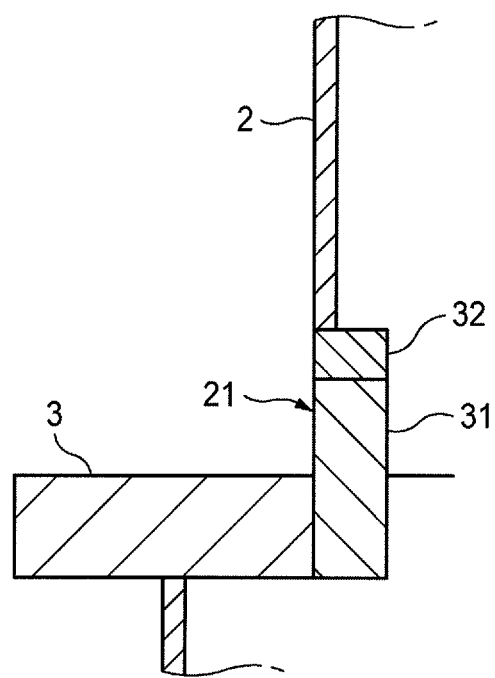
FIG. 3 is a schematic sectional view of an interior panel of a door having a first illumination part provided.
Figure 4:
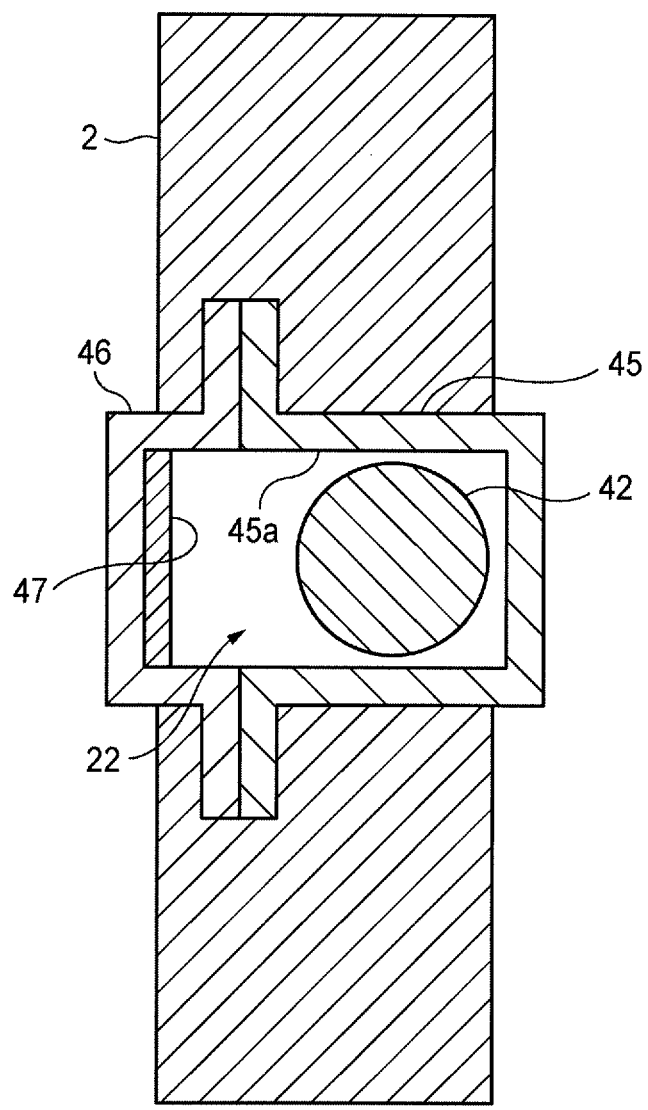
FIG. 4 is a schematic sectional view of the interior panel of the door having a second illumination part provided.

FIG. 1 is a schematic view of a vehicle interior of a motor vehicle provided with a vehicle interior illumination device according to an exemplary embodiment of the present invention. FIG. 2 is a schematic structure diagram of illumination parts of the vehicle interior illumination device according to the present exemplary embodiment. FIG. 3 is a schematic sectional view of an interior panel of a door having a first illumination part provided. FIG. 4 is a schematic sectional view of the interior panel of the door having a second illumination part provided.

As shown in FIG. 1, the vehicle interior illumination device 11 according to the present exemplary embodiment of the invention is provided in a door 1 and a console 6 of a motor vehicle. The vehicle interior illumination device 11 includes a first illumination part 21, a second illumination part 22 and a third illumination part 23.

The first illumination part 21 and the second illumination part 22 are provided in an interior panel 2 of the door 1. Both the first illumination part 21 and the second illumination part 22 are lengthy illuminations.

The first illumination part 21 is provided substantially in an intermediate part in a direction of height of the interior panel 2 of the door 1 and arranged substantially in a horizontal direction. The first illumination part 21 is arranged along an arm rest 3 provided in the interior panel 2. In the arm rest 3, a switch part 4 for a power window or locking the door is provided in a front side of the vehicle and a door pocket 5 is provided in a rear side of the vehicle.

The second illumination part 22 is provided in a lower side of the first illumination part 21 in the interior panel 2. The second illumination part 22 is arranged in an upper part of an accommodation part 8 provided in a lower part of the interior panel 2. The second illumination part 22 is arranged so as to draw a moderate curve from the front side of the vehicle to the rear side of the vehicle and be inclined downward. In the second illumination part 22, an end part in the front side of the vehicle is arranged in the vicinity of the lower part of the first illumination part and an end part in the rear side of the vehicle is arranged in the vicinity of a lower end of the door 1.

The third illumination part 23 is provided in the console 6. In the console 6, a console box 7 is provided and the third illumination part 23 is provided in a bottom part of the console box 7.

As shown in FIG. 2, the first illumination part 21 includes a plane light emitting part 31, a line light emitting part 32 and a light source 32. The plane light emitting part 31 has a light guide plate. The line light emitting part 32 has a light guide rod. In the first illumination part 21, the plane light emitting part 31 having the light guide plate and the line light emitting part 32 having the light guide rod are integrally formed. The light source 33 is formed with an LED (Light Emitting Diode) to guide lights from the light source 33 to the plane light emitting part 31 and the line light emitting part 32. Thus, in the first illumination part 21, the plane light emitting part 31 is turned on in a planar form and the line light emitting part 32 is linearly turned on.

As shown in FIG. 3, the first illumination part 21 is accommodated in the interior panel 2 and a part thereof is exposed in an upper part of the arm rest 3. Thus, the lights emitted in the line light emitting part 32 and the plane light emitting part 31 of the first illumination part 21 are applied to the vehicle interior by the exposed parts.

As shown in FIG. 2, the second illumination part 22 includes a line light emitting part (a light emitting part) 42 and light sources 43 provided at both ends of the line light emitting part 42. The line light emitting part 42 has a light guide rod. The light source 43 is formed with an LED (Light Emitting Diode) to guide lights from the light source 43 to the line light emitting part 42. Thus, in the second illumination part 22, the line light emitting part 42 is linearly turned on.

As shown in FIG. 4, the second illumination part 22 is accommodated in the interior panel 2. In the second illumination part 22, the line light emitting part 42 is accommodated in a groove part 45a of a stay 45 attached to the interior panel 2. In the stay 45, to an opening side of the groove part 45a, a cover 46 is attached. Thus, the opening part of the groove part 45a of the stay 45 in which the line light emitting part 42 is accommodated is closed to cover the line light emitting part 42. The cover 46 is partly exposed in the vehicle interior. In an inner surface side of an exposed part of the cover 46, an optical part 47 such as a lens is provided to diffuse or converge the lights. Thus, the lights emitted from the line light emitting part 42 of the second illumination part 22 are diffused or converged by the optical part 47 and applied to the vehicle interior from the cover 46. The cover 46 is formed with, for example, a resin material colored by a dark color such as a brown color or a black color and having a light transmission property. Thus, in the second illumination part 22, the line light emitting part 42 is invisible from the vehicle interior by the cover 46 when the second illumination part 22 is not turned on.

As shown in FIG. 2, the third illumination part 23 includes a plane light emitting part 51, a line light emitting part 52 and a light source 53. The plane light emitting part 51 has a light guide plate. The light source 53 is formed with an LED (Light Emitting Diode) to guide lights from the light source 53 to the plane light emitting part 51 and the line light emitting part 52. Thus, in the third light emitting part 23, the plane light emitting part 51 is turned on in a planar form and the line light emitting part 52 is linearly turned on.

Now, a control system of the vehicle interior illumination device 11 will be described below.

Figure 5:
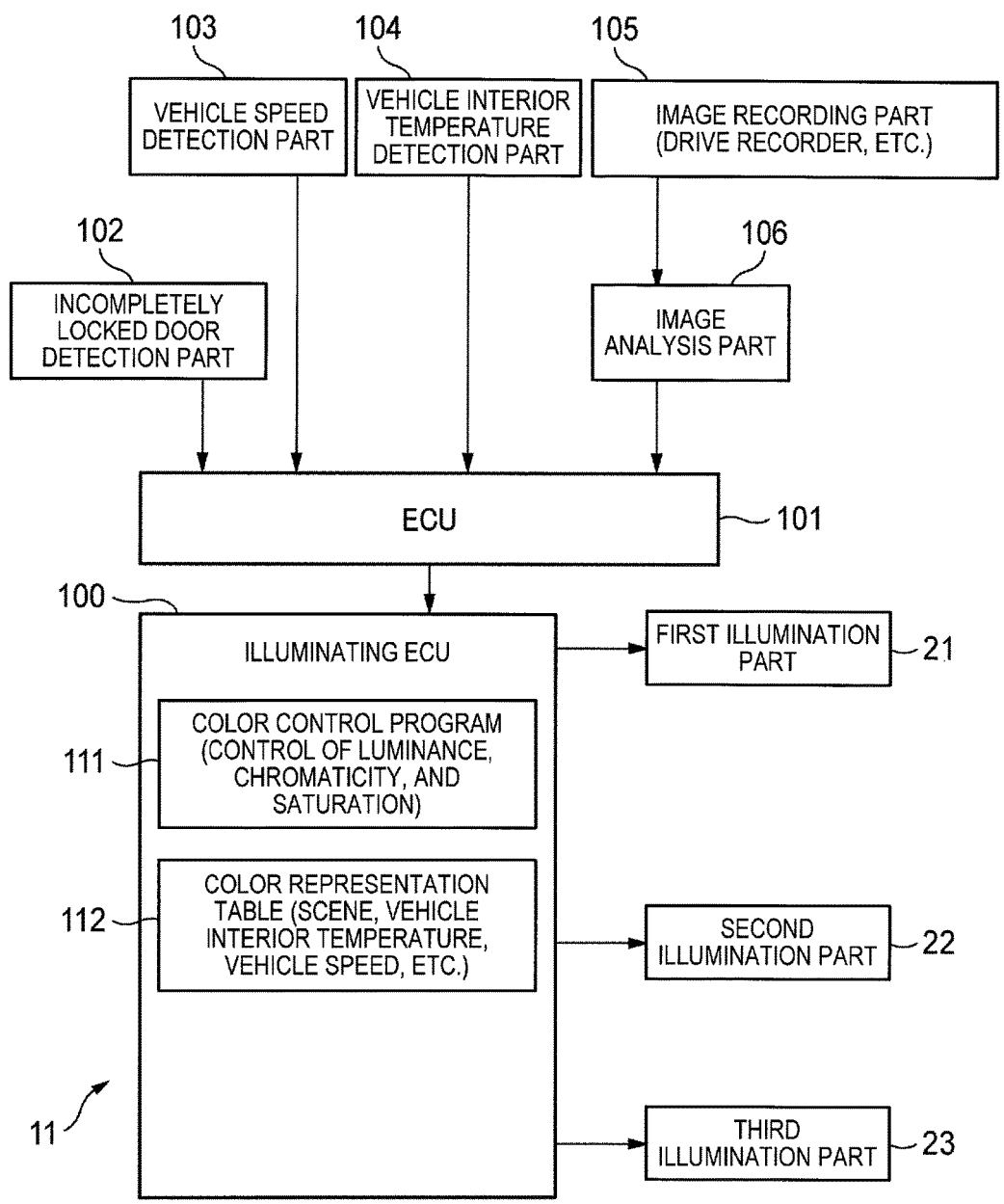
FIG. 5 is a block diagram explaining a control system of the vehicle interior illumination device according to the present exemplary embodiment.
Figure 6:
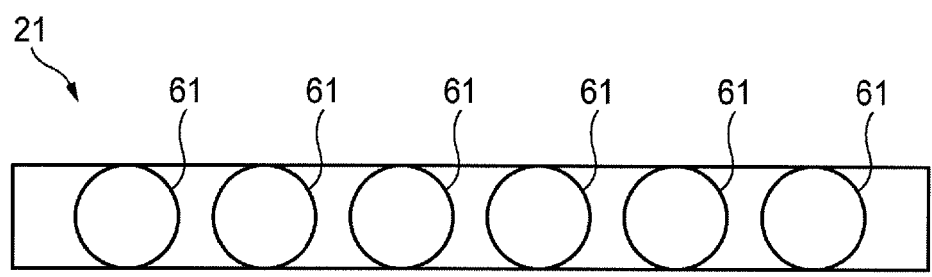
FIG. 6 is a schematic structure diagram showing a light source provide in the first illumination part.

FIG. 5 is a block diagram for explaining the control system of the vehicle interior illumination device according to the present exemplary embodiment.

As shown in FIG. 5, the vehicle interior illumination device 11 includes an illuminating ECU (a control part) 100. The illuminating ECU 100 is connected to an ECU 101 for the vehicle which totally controls the vehicle. The vehicle includes an incompletely locked door detection part 102, a vehicle speed detection part 103, a vehicle interior temperature detection part 104, an image recording part 105 such as a drive recorder and an image analysis part 106. The incompletely locked door detection part 104, the vehicle speed detection part 103 and the vehicle interior temperature detection part 104 are connected to the ECU 101 for the vehicle. The image recording part 105 is connected to the image analysis part 106. The image analysis part 106 is connected to the ECU 101 for the vehicle.

Each of the ECU 100 and the ECU 101 may include, e.g., a memory configured to store instructions or programs; and at least one processor configured to execute the instructions or programs to cause the vehicle interior illumination device 11 or the vehicle to execute control of the operations of the vehicle interior illumination device 11 or the vehicle.

The incompletely locked door detection part 102 detects a state that the door 1 of the vehicle is not completely closed, what is called, a state of a half-locked door to transmit a half-locked door detection signal to the ECU 101. The vehicle speed detection part 103 detects a vehicle speed during a driving of the vehicle to transmit a vehicle speed detection signal to the ECU 101. The vehicle interior temperature detection part 104 detects a temperature of the vehicle interior to transmit a vehicle interior temperature detection signal to the ECU 101. The image recording part 105 records an image such as a scene outside the vehicle to transmit an image signal to the image analysis part 106. The image analysis part 106 analyzes the image signal from the image recording part 105 to transmit an analyzed image signal to the ECU 101. The ECU 101 transmits the half-locked door detection signal, the vehicle speed detection signal and the vehicle interior temperature detection signal from the incompletely locked door detection part 102, the vehicle speed detection part 103 and the vehicle interior temperature detection part 104 and the image signal from the image analysis part 106 to the illuminating ECU 100.

To the illuminating ECU 100, the first illumination part 21, the second illumination part 22 and the third illumination part 23 are connected. In the illuminating ECU 100, a color control program 111 and a color representation table 112 are stored. The illuminating ECU 100 generates an illuminating control signal by the color control program 111 and the color representation table 112 in accordance with the half-locked door detection signal, the vehicle speed detection signal, the vehicle interior temperature detection signal and the image signal transmitted from the ECU 101. Then, the illuminating ECU 100 transmits the generated illuminating control signal to the first illumination part 21, the second illumination part 22 and the third illumination part 23. Thus, the first illumination part 21, the second illumination part 22 and the third illumination part 23 carries out an illumination in accordance with the illuminating control signal from the illuminating ECU 100.

Now, a method for illumination in the vehicle interior illumination device 11 will be described below.

(Control of the First Illumination Part 21 and the Second Illumination Part 22)

The illuminating ECU 100 controls turning on and off operations and light emitting colors of the first illumination part 21 and the second illumination part 22 by control modes based on a plurality of selected themes.

(1) Control Mode Based on Scene

When the control mode is set to a control mode based on a scene, the illuminating ECU 100 turns on the first illumination part 21 and the second illumination part 22 by a color which represents the scene outside the vehicle in accordance with the image signal. At this time, the illuminating ECU 100 activates the color control program 111, calculates a color high in its occupation rate in the image recorded by the image recording part 105, and extracts two colors included in the type of the color from the color representation table 112 to turn on the first illumination part 21 and the second illumination part 22 by the extracted different two colors.

For example, when the image recording part 105 records images of cherry blossoms during a driving of the vehicle in an avenue of the cherry blossoms, the first illumination part 21 is turned on by light pink and the second illumination part 22 is turned on by deep pink so as to represent a scene of the avenue of the cherry blossoms.

When the image recording part 105 records an image of the sea during a driving of the vehicle along the sea, the first illumination part 21 is turned on by a blue color and the second illumination part 22 is turned on by a light blue color so as to represent the scene of the sea.

When the image recording part 105 records an image of woods during a driving of the vehicle in the mountain, the first illumination part 21 is turned on by a green color and the second illumination part 22 is turned on by a yellowish green color so as to represent the scene of the woods.

When the image recording part 105 records an image of the street of a city during a driving of the vehicle in the street of a city, the first illumination part 21 is turned on by a violet color and the second illumination part 22 is turned on by an orange color so as to represent the scene of the street of the city.

As described above, the illuminating ECU 100 represents the scene outside the vehicle in the colors by the illuminations of two systems of the first illumination part 21 and the second illumination part 22 in the control mode based on the scene.

When a preceding vehicle is a large vehicle, a color which represents the scene outside the vehicle may be possibly hardly extracted from the image recorded by the image recording part 105. In such a case, the illuminating ECU 100 extracts colors in both right and left sides of the image. Further, the color may be extracted by applying the color to a previously supposed pattern or a safe color such as a whitish color may be selected.

(2) Control Mode Based on Vehicle Interior Temperature

When the control mode is set to a control mode based on the vehicle interior temperature, the first illumination part 21 and the second illumination part 22 are turned on colors which allow persons riding on the vehicle to feel a comfortable temperature in accordance with the vehicle interior temperature detection signal from the vehicle interior temperature detection part 104. At this time, the second illumination part 22 is more brightly turned on by a whitish color than the first illumination part 21.

For example, when the vehicle interior temperature is 30° C. or higher, the first illumination part 21 and the second illumination part 22 are turned on by two bluish colors different in depth.

When the vehicle interior temperature is 25° C. to 30° C., the first illumination part 21 and the second illumination part 22 are turned on by two light bluish colors different in depth.

When the vehicle interior temperature is 20° C. to 25° C., the first illumination part 21 and the second illumination part 22 are turned on by two bluish white colors different in depth.

When the vehicle interior temperature is 15° C. to 20° C., the first illumination part 21 and the second illumination part 22 are turned on by two orange type white colors different in depth.

When the vehicle interior temperature is 10° C. to 15° C., the first illumination part 21 and the second illumination part 22 are turned on by two light orange type colors different in depth.

When the vehicle interior temperature is 10° C. or lower, the first illumination part 21 and the second illumination part 22 are turned on by two orange type colors different in depth.

As described above, in the control mode based on the vehicle interior temperature, when the vehicle interior temperature is high, the illuminating ECU 100 represents the illumination parts by two colors of a cold color type which suggests a cool feeling. When the vehicle interior temperature is low, the illuminating ECU 100 represents the illumination parts by two colors of a warm color type which suggests warmness.

(3) Control Mode Based on Vehicle Speed

When the control mode is set to a control mode based on the vehicle speed, the illuminating ECU 100 turns on the first illumination part 21 and the second illumination part 22 by colors from which the persons riding on the vehicle can feel the vehicle speed in accordance with the vehicle speed detection signal from the vehicle speed detection part 103. At this time, the second illumination part 22 is turned on more brightly by a whitish color than the first illumination part 21.

For example, when the vehicle speed is low, the first illumination part 21 and the second illumination part 22 are turned on by two whitish colors.

When the vehicle speed is medium, the first illumination part 21 and the second illumination part 22 are turned on by two orange type colors.

When the vehicle speed is high, the first illumination part 21 and the second illumination part 22 are turned on by two reddish colors.

As for the control mode based on the vehicle speed, an intensity of illumination may be changed depending on the vehicle speed with a change of the illuminating color or in place of the change of the illuminating color.

For example, when the vehicle speed is low, the first illumination part 21 and the second illumination part 22 are turned on by the intensity of illumination as high as 20%.

When the vehicle speed is medium, the first illumination part 21 and the second illumination part 22 are turned on by the intensity of illumination as high as 50%.

When the vehicle speed is high, the first illumination part 21 and the second illumination part 22 are turned on by the intensity of illumination as high as 100%.

As described above, in the control mode based on the vehicle speed, the illuminating ECU 100 carries out a representation which allows the persons riding on the vehicle to feel the vehicle speed by the illuminations of two systems of the first illumination part 21 and the second illumination part 22.

(Control of First Illumination Part 21)

The illuminating ECU 100 controls the first illumination part 21 to be turned on as an illumination for warning.

For example, when the door 1 is not completely closed, what is called, at the time of a state of the half-locked door in accordance with the half-locked door detection signal from the incompletely locked door detection part 102, the illuminating ECU 100 generates a warning that the first illumination part 21 is flashed to inform the persons riding on the vehicle of the half-locked door.

In the warning of the half-locked door, for example, the illuminating ECU 100 allows the first illumination part 21 to be flashed by an orange color (repeat a turning on operation for one second and a turning off operation for one second) in an initial stage. After a prescribed time elapses (for example, after 10 seconds), the illuminating ECU 100 allows the first illumination part 21 to be flashed by a red color (repeat a turning operation (for 0.5 seconds and a turning off operation for 0.5 seconds).

Further, the illuminating ECU 100 controls the first illumination part 21 to be turned on as an illumination for recognition of a driving speed which informs the persons riding on the vehicle of the vehicle speed.

For example, the illuminating ECU 100 changes the light emitting color or the intensity of illumination of the first illumination part 21 in accordance with the vehicle speed detection signal from the vehicle speed detection part 103.

When the light emitting color is changed, the first illumination part 21 is allowed to emit lights of white color, for example, under a low speed, lights of orange color under a medium speed and lights of red color under a high speed.

Further, when the intensity of illumination is changed, the first illumination part 21 is allowed to emit lights with the intensity of illumination as high as 20%, for example, under a low speed, as high as 50% under a medium speed and as high as 100% under a high speed.

The first illumination part 21 may have a plurality (six in the present exemplary embodiment) of light sources 61 formed with LEDs (Light Emitting Diodes) arranged in one row.

In a structure having the plurality of light sources 61, the number of the light sources 61 which are turned on is changed to change a lighting range so that the persons riding on the vehicle may recognize the vehicle speed.

Specifically, at the vehicle speed of 40 km/h to 60 km/h, the two light sources 61 are turned on. At the vehicle speed of 70 km/h to 90 km/h, the four light sources 61 are turned on. At the vehicle speed of 100 km/h or higher, the six light sources 61 are turned on.

As described above, in the vehicle interior illumination device 11 according to the present exemplary embodiment, the first illumination part 21 and the second illumination part 22 are allowed to emit lights by the different colors of the same type relating to the theme selected from the scene, the vehicle interior temperature or the vehicle speed. Thus, the vehicle interior can be represented in such an atmosphere as to meet the theme. Thus, the vehicle interior illumination device of the present invention can obtain a higher decoration effect than the vehicle interior illumination device in which the monochromatic lights are merely emitted.

Especially, when the theme is selected in accordance with the image signal from the image recording part 105 which records the image outside the vehicle, and the first illumination part 21 and the second illumination part 22 are allowed to emit lights by the colors based on the scene outside the vehicle, the vehicle interior can be represented in such an atmosphere as to meet the scene outside the vehicle.

Further, when the theme is selected in accordance with the vehicle interior temperature detection signal from the vehicle interior temperature detection part 104 which detects the temperature of the interior of the vehicle, a comfortable atmosphere can be represented to the persons riding on the vehicle by the light emission of the illumination parts by the colors based on the vehicle interior temperature.

Further, when the theme is selected in accordance with the vehicle speed detection signal from the vehicle speed detection part 103 which detects the vehicle speed, the persons riding on the vehicle can be allowed to feel the vehicle speed by the light emission of the illumination parts by the colors based on the vehicle speed.

Further, in the second illumination part 22, since the line light emitting part 42 which is not turned on is covered with the cover 46 and is invisible, when the line light emitting part 42 emits the lights, an impressive feeling can be given to the persons riding on the vehicle. Further, for example, even if the cover 46 has a dark color to make the line light emitting part 42 invisible when the second illumination part is not turned on, the lights of the line light emitting part 42 can be assuredly transmitted to the vehicle interior by the optical part 47 which diffuses or converges the lights to transmit the lights.

Further, when the second illumination part 22 is turned on, an inner part of the accommodation part 8 of the door 1 can be illuminated. Further, when the second illumination part 22 is turned on with a high luminance by a white color at the time of opening the door 1, the second illumination part 22 can be used as an illumination which illuminates feet of the persons who get on or off the vehicle.

Further, the first illumination part 21 used as a decorated illumination is flashed so that the incompletely locked door may be warned. Thus, the persons riding on the vehicle can be more assuredly warned of the incompletely locked door than a small warning light provided in a periphery of a meter.

Further, the light emitting color, the intensity of illumination or the lighting range of the first illumination part 21 used as the decorated illumination is changed in accordance with the speed of the vehicle, so that the persons riding on the vehicle can be allowed to easily recognize the speed of the vehicle.

The third illumination part 23 may be allowed to emit lights by the different colors of the same type relating to the theme selected from the scene, the vehicle interior temperature or the vehicle speed as well as the first illumination part 21 and the second illumination part 22. In such a way, the decoration effect by the illumination can be more improved.

Further, in the above-described exemplary embodiment, the first illumination part 21 is controlled to warn the incompletely locked door or recognize the vehicle speed, however, warning illuminations for warning the half-locked door or recognition of the vehicle speed may be separately provided.

The present invention is not limited to the above-described exemplary embodiment and may be suitably modified or improved. In addition thereto, materials, forms, dimensions, numbers, arranged positions or the like of component elements in the above-described exemplary embodiments may be arbitrarily used and are not limited as long as the present invention can be achieved.

Now, features of the exemplary embodiment of the vehicle interior illumination device according to the present invention will be briefly summarized and described below respectively in [1] to [5].

[1] A vehicle interior illumination device (11) including:
illumination parts (a first illumination part 21, a second illumination part 22, a third illumination part 23) respectively provided in a plurality of positions in a vehicle; and
a control part (an illuminating ECU 100) which controls turning on and off operations and illuminating colors of the illumination parts (the first illumination part 21, the second illumination part 22, the third illumination part 23),
wherein the control part (the illuminating ECU 100) allows the illumination parts (the first illumination part 21, the second illumination part 22) respectively to emit lights by different colors of a same type relating to a theme selected by the control part.

[2] The vehicle interior illumination device according to [1], wherein the control part (the illuminating ECU 100) selects the theme in accordance with any of an image signal from an image recording part (105) which records an image outside the vehicle, a vehicle interior temperature detection signal from a vehicle interior temperature detection part (104) which detects a temperature in the vehicle, and a vehicle speed detection signal from a vehicle speed detection part (103) which detects a vehicle speed.

[3] The vehicle interior illumination device according to [1] or [2], wherein at least one of the illumination parts (the first illumination part 21, the second illumination part 22, the third illumination part 23) includes a light emitting part (a line light emitting part 42) covered with a cover (46) having an optical part (47) which diffuses or converges and transmits lights, and the light emitting part (the line light emitting part 42) cannot be viewed by the cover (46) when the illumination part is not turned on.

[4] The vehicle interior illumination device according to any one of [1] to [3], wherein the control part (the illuminating ECU 100) allows at least one of the illumination parts (the first illumination part 21, the second illumination part 22, the third illumination part 23) to be flashed when a door (1) is not completely locked in accordance with a detection signal from an incompletely locked door detection part (102) provided in the door (1) of the vehicle.

[5] The vehicle interior illumination device according to any one of [1] to [4], wherein the control part (the illuminating ECU 100) changes the illumination color, an intensity of illumination or a lighting range of at least one of the illumination parts (the first illumination part 21, the second illumination part 22, the third illumination part 23) in accordance with a speed of the vehicle based on a detection signal from a vehicle speed detection part (103) which detects a vehicle speed of the vehicle.

What is claimed is:

1. A vehicle interior illumination device comprising:
illumination parts respectively provided in a plurality of positions in a vehicle; and
a control part which controls turning on and off operations and illuminating colors of the illumination parts,
wherein the control part allows the illumination parts respectively to emit lights by different colors relating to a theme selected by the control part, and
wherein the control part selects the theme in accordance with at least one of an image signal from an image recording part which records an image outside the vehicle, a vehicle interior temperature detection signal from a vehicle interior temperature detection part which detects a temperature in the vehicle, and a vehicle speed detection signal from a vehicle speed detection part which detects a vehicle speed.

2. The vehicle interior illumination device according to claim 1,
wherein at least one of the illumination parts comprises a light emitting part covered with a cover having an optical part which diffuses or converges and transmits lights, and the light emitting part cannot be viewed by the cover when the illumination part is not turned on.

3. The vehicle interior illumination device according to claim 1,
wherein the control part allows at least one of the illumination parts to be flashed when a door is not completely locked in accordance with a detection signal from an incompletely locked door detection part provided in the door of the vehicle.

4. The vehicle interior illumination device according to claim 1,
wherein the control part changes the illumination color, an intensity of illumination or a lighting range of at least one of the illumination parts in accordance with a speed of the vehicle based on a detection signal from a vehicle speed detection part which detects a vehicle speed of the vehicle.

* * * * *